E. C. CALM.
Dress Elevator.
No. 197,015. Patented Nov. 13, 1877.
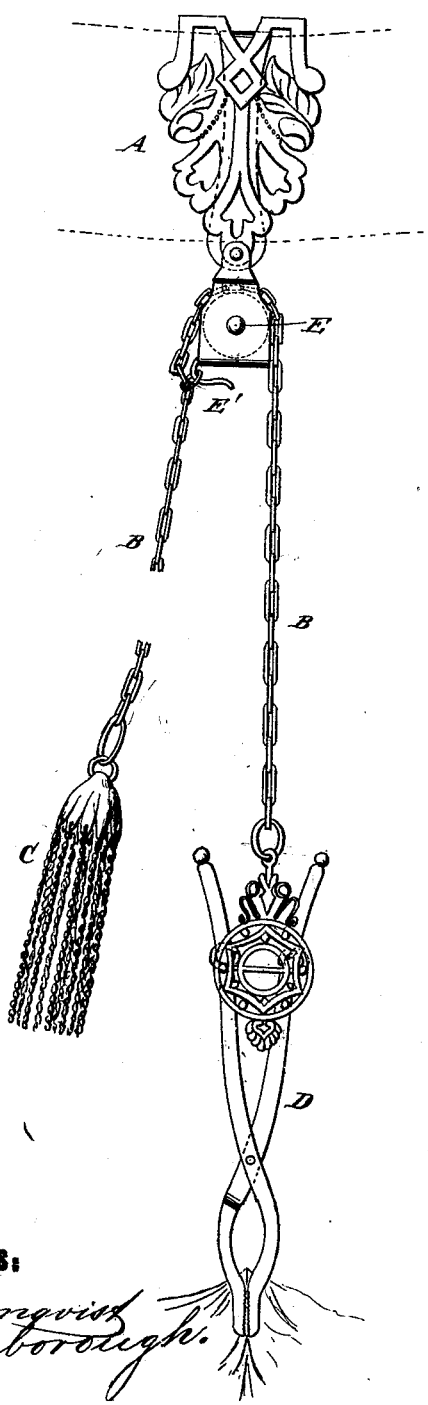
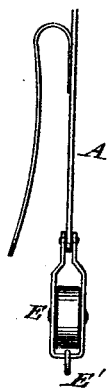

UNITED STATES PATENT OFFICE.

EMIL C. CALM, OF NEW YORK, N. Y.

IMPROVEMENT IN DRESS-ELEVATORS.

Specification forming part of Letters Patent No. 197,015, dated November 13, 1877; application filed September 29, 1877.

*To all whom it may concern:*

Be it known that I, EMIL C. CALM, of the city, county, and State of New York, have invented a new and Improved Dress-Elevator, of which the following is a specification:

In the accompanying drawings, Figure 1 represents a side view of my improved dress-elevator, and Fig. 2 a side view of the adjusting device.

Similar letters of reference indicate corresponding parts.

The object of this invention is to furnish a dress-elevator for ladies' use, of such construction that the dress may be supported at any elevation, and adjusted with great facility, by a simple attachment to the device; and the invention consists of the connection of the hook by which the dress-elevator is attached to the belt, and of the chain to which the dress-holding clamp is applied, of a pulley or other guide device connected to hook, and of a suitable chain-retaining device.

In the drawings, A represents the hook by which the dress-elevator is suspended, in the usual manner, from the belt or other support.

B is the adjusting chain or cord, which has at one end a tassel, C, or other holding device, and at the other a clamping device, D, by which the dress is taken hold of for being elevated.

The hook A is provided at the lower part with a pivoted pulley arrangement, E, over which the elevating-chain B passes, so that the dress may be readily adjusted to any suitable elevation by simply pulling at the tassel.

In place of the pulley a simple guide device, with convex lower part, may be used.

The sheave of the pulley is provided either with a fixed hook, E', or with a spring clasp or clutch device, or the tassel is provided with a hook, so that the dress may be retained at the proper elevation either by attaching the chain to the hook of the sheave, or automatically by the spring-clasp, or by attaching the hook of the tassel to the chain; but the fixed hook of the sheave is simple and more convenient, and, therefore, preferable for securing the dress in elevated position.

By releasing the chain from the retaining device the dress may be quickly and easily lowered, as the pulley or guide admits the easy passage of the chain.

The pulley or guide facilitates the adjustment of the dress, and admits the very convenient handling of the elevating device.

Having thus described my invention, I claim as new and desire to secure by Letters Patent—

The combination, in a dress-elevator, with the guide-pulley E and hook E', on belt-hook A, of the chain B, connected with the dress-clamp D, and passing over the pulley E, substantially as and for the purpose specified.

EMIL C. CALM.

Witnesses:
PAUL GOEPEL,
ALEX. F. ROBERTS.